March 18, 1930.  C. M. ANDERSON  1,751,021
METER
Filed Aug. 15, 1927  2 Sheets-Sheet 1
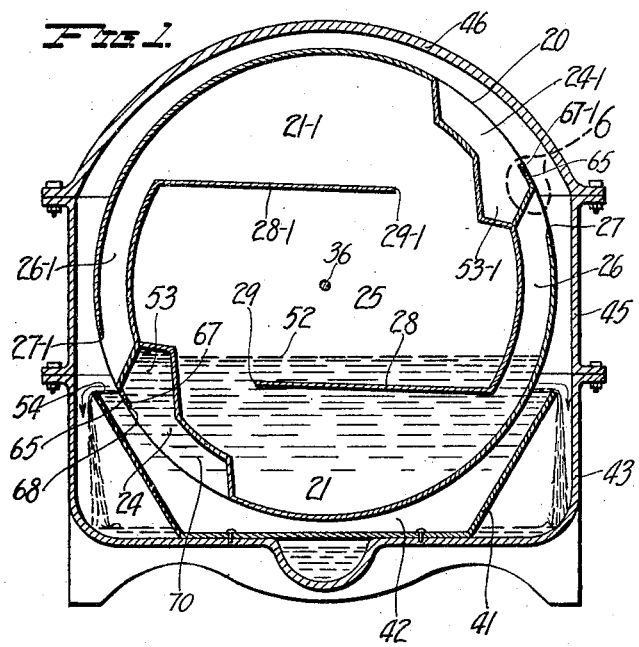
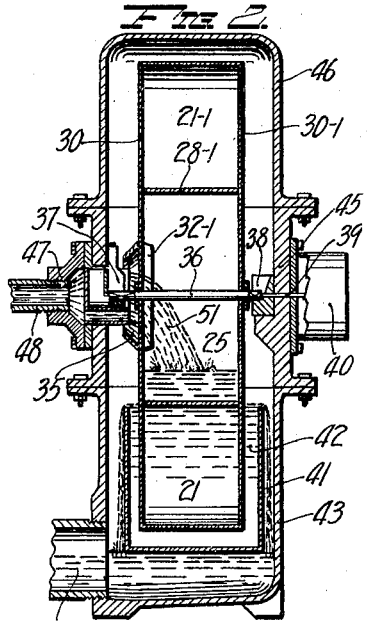
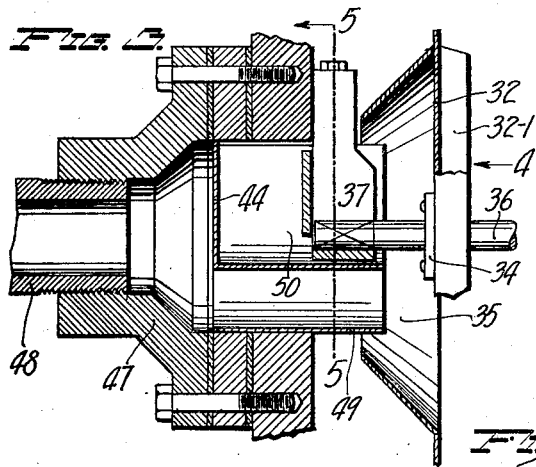
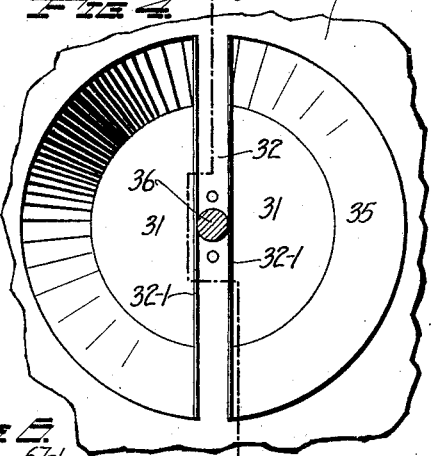
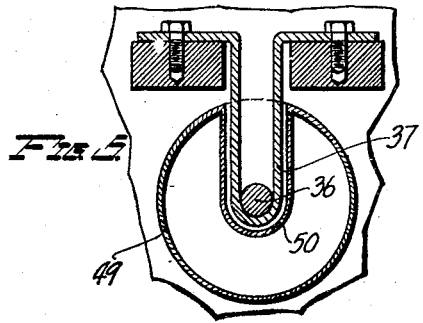
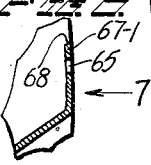
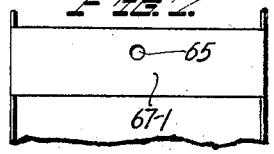
Inventor
C. M. ANDERSON
By
Attorney March 18, 1930. C. M. ANDERSON 1,751,021
METER
Filed Aug. 15, 1927 2 Sheets-Sheet 2
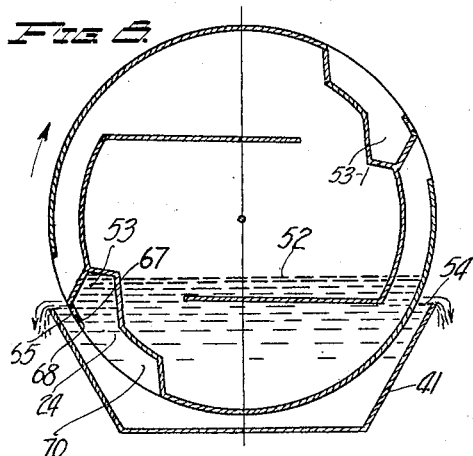
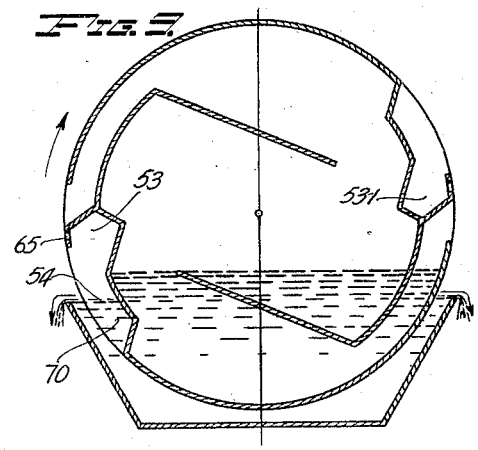
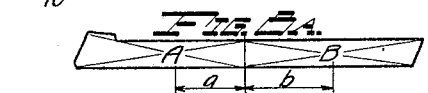
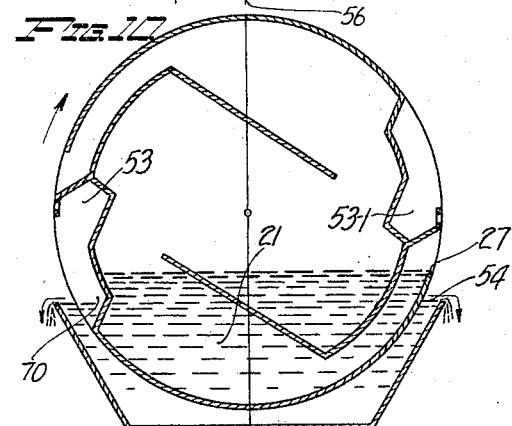
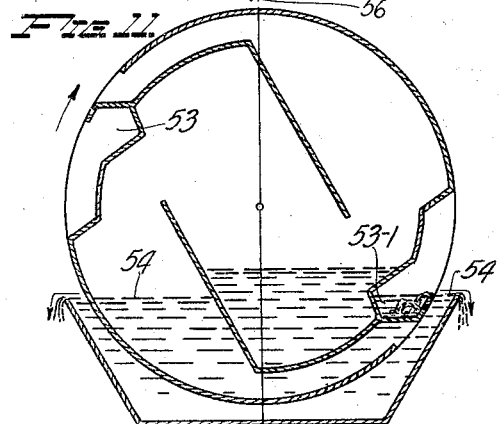
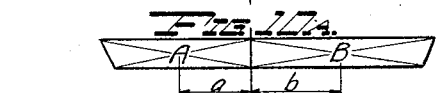
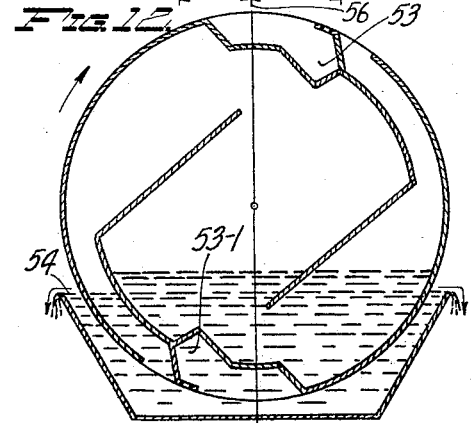
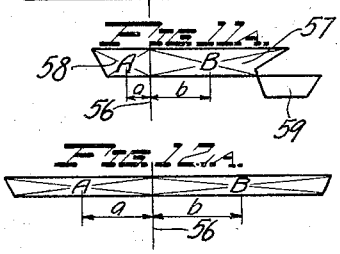
Inventor
C. M. ANDERSON.
Attorney Patented Mar. 18, 1930

1,751,021

UNITED STATES PATENT OFFICE

CHARLES M. ANDERSON, OF SALT LAKE CITY, UTAH

METER

Application filed August 15, 1927. Serial No. 213,119.

This invention relates to a meter and constitutes an improvement upon the one for which Letters Patent of the United States were granted me April 19, 1927, No. 1,625,583.

The principal objects of the present invention are the same as those of my previous invention just mentioned, with the addition of those enumerated below; namely, First, to have an increased capacity; second, to have greater speed; third, to have even greater accuracy; fourth, to occupy a minimum space.

In general, the present invention operates on the same principles as the one forming the subject of the aforementioned patent, but owing to a more advantageous arrangement of the measuring buckets, balancing pockets and supply compartment, relatively to each other, an improved result in operation, as well as a simplified construction, are achieved.

In the present invention, the balancing pockets are substantially at the circumference of the rotor, and are open along its circumferential surface. When the rotor is in motion, the balancing pockets pass directly through the submerging bath, or body, of liquid, and are thus, at the proper intervals, in instant communication with the said bath. Furthermore, as the balancing pockets are lifted out of the submerging bath, certain dipper portions thereof are substantially in the inverted position and carry their content of liquid higher than the level of the submerging bath, thereby causing a pronounced retardation of the rotor before the quantity-gauging lip or simply gauging lip of the bucket reaches the surface of the liquid within the rotor. This means that the gauging lip cuts off the desired unit quantity of liquid while the liquid is substantially quiescent. Just before the gauging lip comes into coincidence with the surface of the liquid within the bucket, the liquid in the balancing pocket begins emptying, and then, as the gauging lip reaches the said surface, the entire quantity of liquid is rapidly discharged, thereby unbalancing the rotor to such an extent that a sudden, sharp impulse in the direction of rotation results, thus giving the rotor a quick start, and accelerating this motion until the gauging lip of the next bucket comes almost to the point of cutting off, when the rotor is again retarded and the previously described actions are repeated for this second bucket.

The features of this invention for which the protection of Letters Patent of the United States is desired, are collectively grouped in the claims concluding this specification.

In the drawing which illustrates merely one embodiment of my invention:

Fig. 1 represents a longitudinal, vertical, center section;

Fig. 2, a vertical center cross-section;

Fig. 3, a fragmentary section, enlarged, relatively to Figs. 1 and 2 to show details, the section being taken on line 3—3, Fig. 4;

Fig. 4, an elevation looking in the direction of arrow 4, Fig. 3;

Fig. 5, a section on line 5—5, Fig. 3;

Fig. 6, an enlargement of substantially the portion included within the broken line 6, Fig. 1;

Fig. 7, an elevation looking in the direction of arrow 7, Fig. 6; Fig. 7$^a$, a modified portion of Fig. 7;

Figs. 8 to 12, diagrams, in longitudinal vertical section showing various positions of the rotor; and, Figs. 8$^a$ to 12$^a$, diagrams corresponding respectively to Figs. 8 to 12, and representing the relative quantities of liquid on either side of the vertical plane containing the rotor axis, in the different positions of the rotor.

Referring to the drawing, 20 indicates the rotor, which may be a sheet metal structure, substantially cylindrical in form, and defining the measuring buckets 21, 21$^1$, the balancing pockets 24, 24$^1$, and the centrally disposed supply compartment 25, into which the rotor is divided. At 26 and 26$^1$ are defined discharge passages leading from the buckets 21 and 21$^1$ to the discharge lips 27 and 27$^1$. Separating the supply compartment from buckets 21 and 21$^1$ respectively, are the walls 28 and 28$^1$, these walls terminating respectively in the gauging lips 29 and 29$^1$. The various compartments extend substantially parallel with the rotor axis, between the heads 30 and 31$^1$. The walls defining the balancing pockets 24 and 24¹, Fig. 1, may be placed as best suits the requirements of each individual design.

Fixed on one head of the rotor, for instance, the head 30, is the inwardly flaring collar 35 defining the inlet openings 31 to the rotor. These openings are substantially concentric with the rotor, leaving between them, the spoke or rib 32, which may have the flanges 32¹ and carry the hub reinforcement 34. The metal of the rotor is preferably quite thin, as the purpose is to make the rotor light in weight so that it may be readily set in motion by the small head of liquid which furnishes the motive power.

The rotor is rigidly mounted on the shaft 36, which is carried in the bearings 37 and 38. The shaft 36, at one end thereof, may have the extension stem 39, which actuates a revolution counter 40 in any well known manner. The revolution counter may be of any standard manufacture, and so, need not be further described herein.

A trough or basin 41 contains the submerging bath, or body, of liquid 42. The rotor and the basin may be enclosed in a casing which in the present instance consists of the base 43, the middle portion 45 and the cap 46. The middle portion 45 supports the bearings 37 and 38, as well as the flange 47, to which latter is connected the liquid inlet pipe 48.

In operation, supposing the liquid which is to be measured, to be flowing in through the pipe 48, the liquid is conducted through the sleeve 49, around the reentrant guard 50 extending over the bearing 37, and into the supply compartment 25, somewhat after the manner shown at 51, Fig. 2. Wall 44 keeps liquid out of guard 50.

Assuming the liquid in the rotor to have risen to the level 52, Figs. 1 and 8, it will be observed that the dipper portion 53 of the balancing pocket 24 has become inverted and has carried its content of liquid above the level 54 of the submerging bath. In this position, a small hole 65 in the dipper wall 67 allows air to enter the dipper 53, causing the liquid held therein to begin flowing out, so that when the dipper lip 68 reaches the level 54 substantially the entire contents of the dipper 53 will have been discharged. At this point the body of liquid contained in the rotor above the level 54, has substantially the shape, in section, of the geometric figure shown in Fig. 9ª. The difference between the portion of this figure to the right of center line 56 and the portion to the left of 56, represents the amount of liquid whose weight is effective to accelerate the motion of the rotor in the direction of the arrow. As the liquid continues to flow into the supply compartment, the unbalanced relation of the portions of the liquid above the level 54 will continue, another stage in the rotation being shown in Fig. 10ª.

When the rotor has reached the position shown in Fig. 11, the unbalanced condition will be represented by the diagram in Fig. 11ª in which the portion 57 represents liquid above level 54 and at the right of center line 56, and 58 the portion to the left of center line 56. The portion 59 represents substantially the section of the inside of the dipper acting initially as a float to reduce the overbalancing action of the larger quantity of liquid 57, thus somewhat retarding the action of the rotor. When the rotor has reached the position shown in Fig. 12, the liquid above the level 54 approaches a balance on either side of center line 56, as indicated in Fig. 12ª. The next position of the rotor will again be represented by Fig. 1, but this time it will be the dipper 53¹ to occupy the position 53.

It will be observed in Fig. 10, that the liquid in the bucket 21 is just ready to flow over the discharge lip 27; when this lip reaches the surface 54, the liquid from the bucket 21, to the extent of the unit quota, will have been discharged into the basin. As the basin is constantly full to overflowing, the unit amount of liquid immediately runs over into the catch basin formed in the base 43, Figs. 1 and 2, and from there is discharged through the pipe 60.

In the diagrams Figs. 8 to 12, the balancing and unbalancing action of the liquid in flowing through the buckets of the meter will readily be understood by noting the relation of moment A times $a$ to moment B times $b$ in the various positions of the rotor.

The simplicity of the rotor, being in the form of a drum with two plane heads joined to each other by the walls constituting the measuring buckets and balancing pockets, will be apparent. This results in a minimum of material required for construction, and reflects an advantage in operation, for the reason that a minimum inertia only, has to be overcome by the small head of liquid under which the meter operates.

For accuracy in any rotary volumetric meter, of which the present invention is an outstanding type, it is imperative that the rotor be brought to substantially a standstill while the liquid being measured, is gauged or cut off. For capacity, the rotor must remain in motion at the maximum speed for as great a proportion of its travel as possible. This means that the rotor must be promptly started after each period of retardation and be brought up to maximum speed as quickly as possible. Again, when the rotor is in motion, it must be retarded in as small an interval of time as possible. These requirements for accuracy and capacity in a liquid meter, are met in an eminent degree in the present invention.

While the dipper 53, in the position indicated in Figs. 1 and 8, is acting to substantially balance the rotor, having previously retarded the same, yet, immediately after air begins to enter through the opening 65, the dipper empties its content of liquid and completely changes its functioning by assuming the role of an "unbalancer" due to the fact that its structure diminishes the superposed body of liquid to the left of the center line 56, and causing the liquid to the right of the center line 56 to overbalance the rotor, as will be clear from the theory presently to be explained. This results in giving the rotor a quick start into another cycle of motion. The portion 70 of the balancing pocket, functions to prolong the unbalancing action upon the left of the rotor to the desired degree, as will be clear from an inspection of Figs. 9 and 10. The balancing pockets function very quickly as they are almost entirely open towards the outside of the rotor. This feature especially distinguishes the present invention from my previous one herein mentioned, and also from every other meter of which I am aware.

The theory upon which the operation of this meter depends, is that a horizontal layer or body of liquid confined by the rotor, is superposed upon the level of the submerging body. When the superposed body is symmetrical on both sides of the axial vertical plane of the rotor, then the rotor is stationary, but as soon as this symmetry is disturbed, movement of the rotor takes place. By varying the magnitude of this disturbance at different points in the travel of the rotor, correspondingly varying velocities are imparted to the rotor at these points.

The disturbance is effected by properly shaping the significant contour of the rotor, so as to cause variations in the superposed body on one side of the said center plane, thereby overbalancing the rotor on the opposite side and causing the under side of the rotor to move in a direction away from the overbalanced side. The difference between the two unequal parts of the superposed body at any moment, may be termed the motive differential. This motive differential in the position of the rotor indicated in Figs. 1 and 8, would be the weight of the quantity of liquid equal to the substantially triangular prism defined by the surface plane 52 extended, the circumferential surface of the rotor, and the left wall of pocket 53. It will be noted that the motive differential is located outside the actual shell of the rotor, the space in which the motive differential is manifested, forming an indentation in the theoretical circumferential surface of the rotor. For convenience, that portion of the rotor which defines a balancing pocket together with a dipper, may be called a "diminisher."

Openings such as the hole 65 or the slot 71, in the lip-walls 67 and $67^1$ of the balancing pockets, ease the action of the rotor by admitting air to the dippers, when the latter are inverted. These openings, however, could be dispensed with if desired, in which case the suction created when a dipper leaves the surface 54 of the liquid, might tend to make the action of the rotor more abrupt, thus having a detrimental effect upon the accuracy of the results.

While a specific embodiment of this invention is herein shown and described, it is to be clearly understood that all the detailed parts thereof, may or may not be shown in the preferred forms, and further, that the preferred forms may be varied from time to time, as the development of this invention and the arts to which it appertains progress. Therefore, that which forms an essential and characteristic part of this invention, will be readily discernible from the claims in which its spirit is broadly generalized.

Having fully described my invention, what I claim is:

1. A meter comprising a rotor having a circumferential shell, a basin containing liquid partially submerging said rotor, walls defining balancing pockets spaced apart from each other and positioned so as to indent the circumferential shell of said rotor, walls defining measuring buckets intermediate said balancing pockets, and means for supplying liquid to said buckets.

2. A meter comprising a rotatable drum having a circumferential shell, measuring buckets defined in said drum, means for supplying liquid to said measuring buckets, a basin located to partially submerge said drum, walled passages located to discharge liquid from said buckets to said basin, and indented pockets defined in the circumferential shell of said drum, said pockets located interjacent said measuring buckets.

3. A meter comprising a basin, a rotatable drum having a circumferential shell partially submerged in said basin, measuring buckets spaced apart from each other circumferentially of said drum, means for supplying liquid to said buckets, means defining discharge passages in said drum, said discharge passages leading at intervals of rotative travel from said buckets to said basin, and pockets defined inwardly in the circumferential shell of said drum, said pockets located interjacent said measuring buckets and effective to substantially balance said drum intermittently at predetermined points in the rotation thereof.

4. A meter comprising a drum mounted for rotation around a substantially horizontal axis, balancing pockets defined by indented portions in the circumference of said drum, each of the said balancing pockets having a dipper, a bath of liquid submerging said drum to a level below said axis, the relation between the level of the submerging bath and each dipper being such that each dipper shall become inverted at a certain point of its revolution about the said axis, and shall rise above the said level while in the inverted position.

5. A meter comprising a cylindrical drum having two end heads connected to shell portions spaced apart from each other circumferentially, said drum mounted for rotation about a horizontal axis, there being a substantially central opening defined in one of the said end heads, an inlet sleeve positioned to conduct liquid through said opening, said sleeve having a reentrant guard substantially parallel to the axis of said drum, and a bearing for said shaft accommodated within the said reentrant guard.

6. A meter comprising a rotor, a basin containing liquid partially submerging said rotor, balancing pockets spaced apart from each other and defined by circumferentially indented portions of said rotor, said balancing pockets being open towards the outside of said rotor, measuring buckets interjacent said balancing pockets and means for supplying liquid to said buckets.

7. A meter comprising a rotor, measuring buckets defined in said rotor, quantity-gauging lips defining entrances to said buckets, a basin containing liquid at a constant level submerging said rotor to a predetermined extent, balancing pockets defined circumferentially intermediate said measuring buckets, said balancing pockets being horizontally opposite the quantity-gauging lip when said lip is a predetermined distance above the said predetermined liquid level in said basin, and means for supplying liquid to said buckets.

8. A meter comprising a rotor, means defining measuring buckets in said rotor, quantity-gauging lips defining entrances to said buckets, a basin containing liquid at a constant level submerging said rotor to a predetermined extent, and diminishers defining balancing pockets including dippers circumferentially intermediate said measuring buckets, the said balancing pockets being so located that when a quantity-gauging lip reaches a predetermined plane above the submerging plane, the said predetermined plane shall pass through the corresponding balancing pocket at a point below said dipper.

9. A rotatable drum having measuring buckets defined within and spaced around the periphery thereof, indented circumferential portions defining balancing pockets peripherally intermediate said measuring buckets, and a centrally defined supply compartment for liquid, said compartment being in operative communication with said measuring buckets.

10. In a meter, a rotor comprising a centrally defined liquid-supply compartment, measuring buckets defined on either side of said supply compartment, a communicating passage defined between said supply compartment and each of the said measuring buckets, and balancing pockets defined peripherally intermediate said measuring buckets, said balancing pockets defined by diminishers open towards the outside of said rotor.

11. A rotatable drum having measuring buckets defined around the periphery thereof, balancing pockets defined separate from, but peripherally intermediate said measuring buckets, said balancing pockets being substantially open, facing outwardly from said rotor; and means for supplying liquid to said measuring buckets.

12. A rotatable drum having measuring buckets defined around the periphery thereof, balancing pockets defined separate from, but peripherally intermediate said measuring buckets, said balancing pockets having a dipper portion, a lip wall projecting from said dipper portion, substantially in the circumference of said rotor, means defining an open space in the shell of said rotor beyond said lip, and means for supplying liquid to said buckets.

13. A rotatable drum having measuring buckets defined around the periphery thereof, balancing pockets defined separate from, but peripherally intermediate said measuring buckets, said balancing pockets having a dipper portion, a lip wall having an opening therein projecting from said dipper portion, substantially in the circumference of said rotor, means defining an open space in the shell of said rotor beyond said lip, and means for supplying liquid to said buckets.

14. A liquid-measuring drum having a shell, comprising walls defining buckets, means for rotatably mounting said drum, a liquid supply compartment defined internally of said drum, passages defined for conducting liquid from said supply compartment to said buckets, and balancing pockets defined by indented portions of the shell of said drum, said balancing pockets functioning to substantially balance and unbalance said drum in alternating order.

15. A drum comprising end heads, cylindrical shell portions spaced circumferentially apart from each other to define circumferential openings, said shell portions extending from one to the other of said heads, walls defining pockets located inwardly of said openings, said walls being joined to one cylindrical shell portion but spaced apart from the other cylindrical shell portion, means defining buckets interjacent said pockets, and means for conducting liquid into said buckets.

16. A rotatable drum, comprising a circumferential shell, a centrally defined compartment, secondary compartments defined on either side of said central compartment, and extending to the circumferential shell of said drum, means defining a discharge passage at one end of each secondary compartment, and pockets defined by indented circumferential shell portions intermediate said secondary compartments, each one of the said pockets being contiguous to the discharge passage of one secondary compartment and contiguous to a wall of the other secondary compartment.

17. A rotatable drum having circumferentially defined bucket compartments, each of the said compartments having discharge passages defined at one end thereof, said compartments, further, being diametrically opposite, and in mutually reversed relation to, each other, and circumferentially open pockets defined interjacent the discharge passage of one bucket compartment and a wall of another bucket compartment.

18. A cylindrical drum mounted for rotation around a horizontal axis, said drum having shell portions spaced apart from each other circumferentially, liquid-measuring compartments defined interior to said shell portions, walls defining pockets indented circumferentially and intermediate said shell portions, said walls joined to one shell portion and spaced apart from the adjacent shell portion, and means for feeding liquid to said liquid-measuring compartments.

19. A drum mounted for rotation around a substantially horizontal axis, said drum comprising diametrically opposite circumferential shell portions spaced apart from each other to form circumferential gaps, a pocket formed by a portion of said shell indented in each gap, and a discharge opening defined adjacent each pocket, and measuring compartments defined on the inside of said circumferential shell portions, said measuring compartments being in communication with said discharge openings.

20. A rotatable measuring drum, including walls dividing said drum into a central supply compartment and defining measuring buckets, discharge throats, and balancing pockets having mouths; said measuring buckets radially adjacent said supply compartment and diametrically opposite each other, said discharge throats located at the ends of said buckets, said balancing pockets adjacent said measuring buckets and said mouths substantially at the circumferential surface of said drum.

In testimony whereof, I sign my name hereto.

CHARLES M. ANDERSON.